(12) United States Patent
Durkin et al.

(10) Patent No.: US 8,732,079 B1
(45) Date of Patent: May 20, 2014

(54) CLOUD-BASED DATA AUGMENTATION

(71) Applicant: Bank of America Corporation, Charlotte, NC (US)

(72) Inventors: Thomas J. Durkin, Chicago, IL (US); Alex Y. Yang, Atlanta, GA (US); Doug J. Carlson, New York, NY (US); Brian G. Higgins, Los Angeles, CA (US); Christopher Hope, Toonbridge (GB); Savit A. Pirl, Bolingbrook, IL (US); Milton Santiago, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/709,325

(22) Filed: Dec. 10, 2012

(51) Int. Cl.
*G06Q 40/00* (2012.01)

(52) U.S. Cl.
USPC ............................................. 705/40; 705/30

(58) Field of Classification Search
USPC ....................................................... 705/4–44
See application file for complete search history.

(56) References Cited

U.S. PATENT DOCUMENTS

| | | | |
|---|---|---|---|
| 6,629,081 B1 * | 9/2003 | Cornelius et al. | 705/30 |
| 7,676,431 B2 * | 3/2010 | O'Leary et al. | 705/39 |
| 7,720,760 B1 * | 5/2010 | Cook et al. | 705/40 |
| 7,844,546 B2 * | 11/2010 | Fleishman et al. | 705/39 |
| 8,239,330 B2 * | 8/2012 | Montero et al. | 705/64 |
| 8,352,364 B2 * | 1/2013 | Reardon | 705/39 |
| 2003/0004797 A1 * | 1/2003 | Villaret et al. | 705/14 |
| 2003/0009420 A1 * | 1/2003 | Jones | 705/39 |
| 2003/0119478 A1 * | 6/2003 | Nagy et al. | 455/408 |
| 2004/0148252 A1 * | 7/2004 | Fleishman | 705/39 |
| 2009/0313143 A1 * | 12/2009 | Darensbourg et al. | 705/28 |
| 2011/0087599 A1 * | 4/2011 | Jones | 705/45 |
| 2012/0136780 A1 * | 5/2012 | El-Awady et al. | 705/40 |
| 2012/0323735 A1 * | 12/2012 | Montero et al. | 705/26.41 |

* cited by examiner

*Primary Examiner* — Frantzy Poinvil
(74) *Attorney, Agent, or Firm* — Weiss & Arons LLP; Michael A. Springs, Esq.

(57) ABSTRACT

Apparatus for coordinating a rule-based relationship between a bank, a vendor and a merchant is provided. The apparatus may include a vendor data platform, a vendor payment platform and a vendor clearing platform. The vendor data platform may receive a vendor name, a vendor identification number and vendor banking information and may this information into a third party database maintained by a third party. The vendor payment platform may receive the vendor identification number and a payment amount electronically associated with the vendor identification number without the banking information and transmit, to the third party, the vendor identification number and the payment amount. The vendor clearing platform may receive, from the third party, the payment amount and the banking information, and may transmit information to a clearing house. The information may initiate a transfer of funds into a vendor bank account.

11 Claims, 11 Drawing Sheets

CLOUD-BASED DATA AUGMENTATION

FIELD OF TECHNOLOGY

This invention relates to systems and methods for securely storing and transferring data. Specifically, this invention relates to systems and methods for securely storing and transferring payment information.

BACKGROUND OF THE DISCLOSURE

A large business typically has many vendors who supply the business with a variety of goods and services. For example, a business may have suppliers, trucking personnel, on-site maintenance workers and utility providers. As a result, the business may be required to initiate monthly, weekly or even daily vendor payments.

In order to pay the vendors, the business stores vendor account and routing information in a business database. The business then uses this data to pay its vendors. For example, a business may execute a vendor payment by transmitting to a financial institution the account and routing information of the vendors to be paid, in addition to payment amounts. The financial institution then pays the vendors based on the transmitted account and routing information.

This system is undesirable for both the business and the vendor. This system is undesirable for the vendor because storing sensitive vendor data in a business database leaves the data open to piracy and misappropriation. For example, business employees may access, with authorized permissions, or illegally, vendor data and use it to illegally initiate unauthorized withdrawals. This system is also undesirable for the business because business employees may tamper with the vendor data. For example, a business employee may change a vendor's routing number to his own personal routing number. This diverts payments away from the vendor and may, instead, direct the payments to the business employee's personal bank account.

It would be desirable, therefore, to provide systems and methods for storing vendor data in a secure location, preferably inaccessible to business employees. It would be further desirable to provide systems and methods for a business to initiate vendor payments without combining sensitive data in a single location, such that the data cannot be tampered with by a single operator. It would be yet further desirable to provide systems and methods for transferring sensitive vendor data in a more efficient manner.

SUMMARY OF THE DISCLOSURE

Methods are provided for coordinating a rule-based relationship between a bank, or other suitable financial institution, a merchant and a vendor. The vendor may supply goods and/or services to the merchant. These methods may include using a receiver to receive an identification number and banking information associated with the identification number. These methods may also include using a transmitter to transmit the information to a third party for database storage thereat. These methods may also include receiving a payment instruction associated with the identification number without the banking information associated with the identification number. These methods may additionally include transmitting the identification number, together with the payment instruction, to the third party. These methods may further include receiving banking information associated with the identification number from the third party database.

Alternatively, these methods may further include receiving banking information for association with the payment instruction.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

The systems and methods of the invention relate to storing vendor data in a secure location. The systems and methods of the invention also relate to providing systems and methods for a business to initiate vendor payments without transferring sensitive vendor data.

The systems and methods of the invention may include a cloud-based engine. For the purposes of this application, the cloud-based engine will be described as part of a financial institution. However, it should be noted that any business or service provider may host the cloud-based engine of the systems and methods of the invention.

The cloud-based engine may include at least two platforms. For the purposes of this application, the first platform will be referred to as a 'vendor data platform' and the second platform will be referred to as a 'vendor payment platform.' However, it should be noted that these titles are for descriptive purposes only and in no way limit the functionality of these platforms.

The vendor data platform and the vendor payment platform may be accessed by one or more clients of the financial institution. For the purposes of this application, the client of the financial institution will be described as a business. However, it should be noted that the systems and methods of the invention may be used for any suitable client of a financial institution.

Business employees may access one of the platforms via a web-browser, a light-weight desktop or a mobile application.

An employee may be granted access to a platform using a password and/or a physical device necessary for authentication (hereinafter "security token"). After entering the password and/or the security token, the business employee may be granted access to a client-specific user interface that enables the employee to view, input, delete and/or alter business data.

In some embodiments, a business may authorize a first set of employees to access the vendor data platform and a second set of employees to access the vendor payment platform. For maximum security, the first set of employees may be different from the second set of employees. Additionally, for maximum security, financial institution personnel granted permission to access the vendor data platform may be different from financial institution personnel granted permission to access the vendor payment platform.

The vendor data platform may be used by the business to load vendor data from business database(s) into the vendor data platform. In some embodiments, the vendor data platform may receive additional vendor data when business employees manually input vendor data into a platform customer interface. It should be noted that, for the purposes of this application, a vendor may be any person, company or organization to whom the business desires to execute a payment.

Vendor information received by the vendor data platform may include payment information, business bank information, vendor information, vendor bank information, intermediary bank information, template information, ACH information and/or any other suitable information. Exemplary information input into the vendor data platform is included in Table 1 below.

TABLE 1

Exemplary Information Input into the vendor data platform

| Subject of Information | Exemplary Information Input Into the vendor data platform |
| --- | --- |
| Payment Information | Payment type (e.g. Manage Private Network Service ("MPNS") or Real Time Gross Settlement ("RTGS")), Payment Currency |
| Business Bank ("Debit Bank") Information | Debit Bank Local Clearing Code, Debit Bank Identifier Code ("BIC"), Debit Bank Account Number, Debit Bank Account Currency Code |
| Vendor Information | Vendor Name, Address, City, State, ZIP, Country |
| Vendor Bank Information | Vendor Bank Name, Vendor Bank Local Clearing Code, Vendor Bank BIC, Vendor Bank Account Number, Vendor Bank Address, City, State, ZIP, Country |
| Intermediary Bank Information | Intermediary Bank Name, Intermediary Bank Local Clearing Code, Intermediary Bank Address, City, State, ZIP, Country |
| Template Information | Template Code, Template Name, Date Template Created, Date Template Approved |
| ACH Information | Business ACH Company ID, U.S. ACH Payment Type, Vendor Account Type, Vendor's Bank ID for US ACH |

The vendor data platform may use a template manager to manage the received vendor data. For example, the template manager may use the input vendor data to create a vendor template for each vendor. The vendor template may preferably include custom fields that will be used by the systems and methods of the invention to augment incomplete payment requests sent by the business to the financial institution (as discussed in greater detail below).

In some embodiments, the vendor templates may be substantially permanently stored in the vendor data platform. In other embodiments, the vendor templates may be temporarily stored in the vendor data platform. In some embodiments, when the vendor templates are verified by the business to be correct and authorized, the vendor templates(s) may be extracted from the vendor data platform and securely transmitted via a telecommunications network to a third party. In other embodiments, the vendor template(s) may be transmitted absent verification.

The third party may be a third party hired by the financial institution to provide Software as a Service (SaaS) to the financial institution. The third party may store the transmitted vendor template(s) in one or more third party databases.

The vendor templates stored on the third party database may be inaccessible to financial institution personnel. Alternatively, financial institution personnel may be permitted to view vendor templates but not to alter template information.

The vendor templates stored on the third party database may be accessible to business personnel entrusted with the password and/or security token required to access the vendor data platform. However, in some embodiments, the vendor data platform may allow a first business associate to change information in a vendor template only with the permission and authorization of a second business associate.

In some embodiments, after storage of the vendor data with the third party, the business may delete all vendor data transmitted to the vendor data platform. In these embodiments, the business is relieved of the cost and the resources required to ensure vendor data security. The vendor data is now stored in a remote third party database accessible, preferably, only to select business employees.

However, in order to pay its vendors, the business may retain a plurality of correlation files that associate each business vendor with a unique vendor ID. In some embodiments, the vendor ID may be a sequence of eight numbers. However, any length of numbers, letters, or any combinations of any alphanumeric characters may be used for the vendor ID.

When a business desires to pay some of its vendors, the business may transmit one or more files to the vendor payment platform that include an incomplete payment origination request. The incomplete payment origination request may include one or more vendor IDs and one or more payment amounts. Each payment amount may be associated with a vendor ID. For example, if the business desires to pay Vendor 1 $15,000 and Vendor 1 has been assigned a vendor ID of XXXXXXXX, the business may transmit the ID number XXXXXXXX electronically associated with the payment amount of $15,000.

In some embodiments, each vendor ID may be substantially similar to a Template Code associated with a vendor template. In other embodiments, the vendor ID may be a number included in a vendor template.

The file transmitted to the vendor payment platform may contain any number of payment requests, from a single payment request to a request to pay thousands or tens of thousands of vendors. It should be noted that the business may upload the file to the vendor payment platform via the internet or any other suitable telecommunications network.

Upon receipt of the incomplete payment origination requests, the vendor payment platform may automatically route the received file to the third party. The automatic routing may be a secure data deliver process that maintains the data in the file preferably inaccessible to any business employee or bank personnel.

When the third party receives the transmitted file, the third party may use one or more processors to execute a database merge. The database merge may augment the transmitted file. The file may be augmented by insertion of vendor template data into the file, creating a complete payment origination request. The template data inserted into the file may be selected based on the vendor IDs included in the file. In other words, vendor template data used to augment a file including vendor ID XXXXXXXX may be vendor template data associated with vendor ID number XXXXXXXX.

It should be noted that, in some embodiments, a vendor ID may be associated with a vendor template based on information stored in the vendor template. In other embodiments, a vendor ID may be associated with a vendor template based on correlation files stored in a third party database that associates each vendor ID with a defined vendor name and/or template.

It should be noted further that, because certain embodiments divide the payment files into smaller files, the file size of the transmitted files may be substantially reduced. Because the file size is substantially reduced, sometimes by up to 95%, processing speed may be increased. In certain embodiments, the processing time from vendor payment initiation until vendor payment confirmation was improved by up to 800%—i.e., the processing time from vendor payment initiation until vendor payment confirmation in certain embodiments was eight times faster than in legacy payment systems.

Once the database merge is completed, the third party may substantially immediately thereafter transmit the complete payment origination request to the cloud-based engine via the internet. The cloud-based engine may automatically send the complete payment origination request for clearing. It should be noted that, in some embodiments, the transmission of the complete payment origination request from the third party, to the cloud-based engine and subsequently to clearing, may be an automatic process. No data may be manually altered at any point during the transmission of the completed payment origination request from the third party to the payment transaction network(s), via the cloud-based engine, that will process the payments.

In exemplary embodiments, the processing and clearing of the complete payment origination request may be facilitated by an Automated Clearing House ("ACH"). The ACH may pay the vendors identified in the complete payment origination request by executing an Electronic Fund Transfer in the form of one or more of a wire transfer, a direct deposit or a direct debit. The ACH may be the Federal Reserve Bank or the Electronic Payments Network ("EPN"). In these embodiments, the cloud-based engine may transmit the complete payment origination requests to the ACH for clearing.

It should be noted that the cloud-based engine may also send out complete payment origination requests to the SWIFT (Society for Worldwide Interbank Financial Telecommunication) network, as well as local clearinghouses in non-US countries. In some embodiments, the third party or the cloud-based engine may send part of a complete payment request to a first network for processing and part of the complete payment request to a second network for processing.

After the clearing of the payments, the ACH may transmit a confirmation message to the cloud-based engine confirming that the payments have been made. The cloud-based engine may subsequently transmit the confirmation message to the business. The business may subsequently check the payment off in their systems, and double check that the payment amount is correct. In some embodiments, the transmission of the confirmation message may be an automatic process, with no human intervention possible to alter any data included in the confirmation message.

Thus, systems and methods have been provided that protect a business's vendor data from misappropriation and alteration. Systems and methods have also been provided that enable a business to initiate vendor payments without the transmission of sensitive vendor data.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, the cloud-based engine, the vendor data platform and/or the vendor payment platform may be embodied as a method, a data processing system, or a computer program product. Accordingly, the cloud-based engine, the vendor data platform and/or the vendor payment platform may take the form of an entirely hardware embodiment, an entirely software embodiment or an embodiment combining software and hardware aspects. The same is true for any or all functionalities executed by the third party.

Furthermore, the cloud-based engine, the vendor data platform and/or the vendor payment platform may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, in the event that the cloud-based engine, the vendor data platform and/or the vendor payment platform is embodied at least partially in hardware, the cloud-based engine, the vendor data platform and/or the vendor payment platform may include one or more databases, receivers, transmitters, processors, modules including hardware and/or any other suitable hardware. Furthermore, the operations executed by the cloud-based engine, the vendor data platform and/or the vendor payment platform may be performed by the one or more databases, receivers, transmitters, processors and/or modules including hardware.

Figure 1:
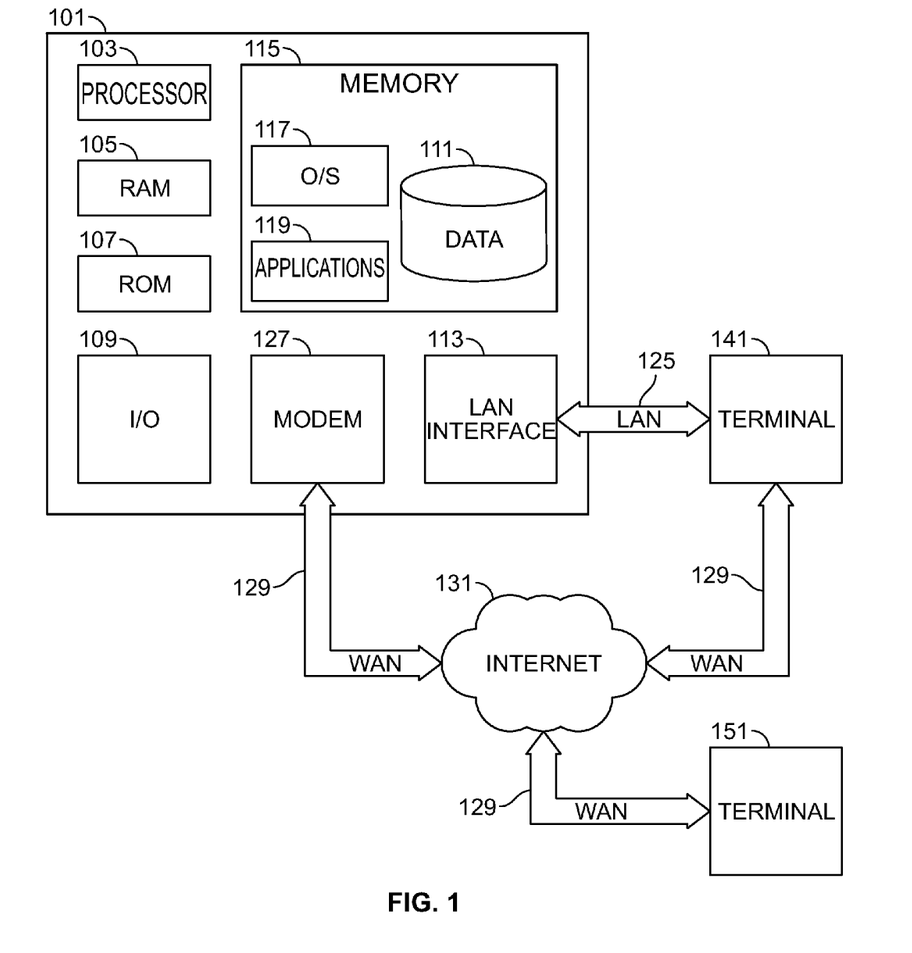
FIG. 1 shows apparatus that may be used in accordance with the systems and methods of the invention.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for information input into the cloud-based engine, the vendor data platform, the vendor payment platform or the third party database.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a cloud-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of the systems and methods of the invention to access and input information into the cloud-based engine, the vendor data platform and/or the vendor payment platform. Information input into the cloud-based engine, the vendor data platform and/or the vendor payment platform may be stored in memory 115. The input information may be processed by an application such as one of applications 119.

FIGS. 2-10 illustrate exemplary processes that may be used in accordance with the systems and methods of the invention. The communications network used for transmitting information in the processes illustrated in FIGS. 2-10 will be described as an internet or web-based communications network. However, it should be noted that any suitable public or private telecommunications network may be used to transmit information detailed in FIGS. 2-10.

Figure 2A:
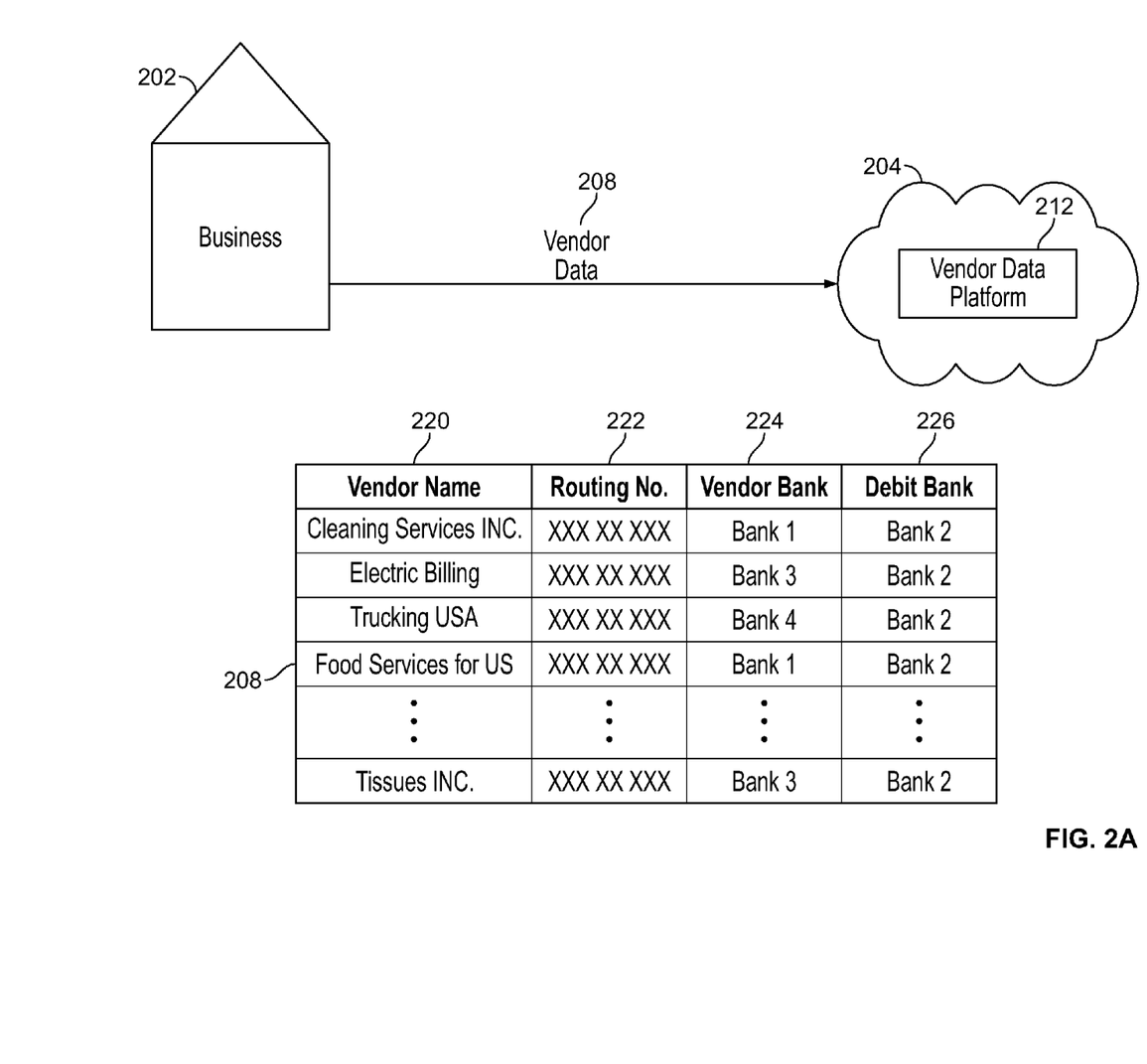
FIG. 2A shows a flow diagram of a process that may be used in accordance with the systems and methods of the invention.

FIG. 2A shows a flow diagram of an exemplary process that may be used in some embodiments of the invention. The exemplary process illustrated in FIG. 2A may include business 202 uploading vendor data 208 into cloud-based engine 204 using an internet connection. In some embodiments, business 202 may upload vendor data 208 into cloud-based engine 204 via vendor data platform 212.

FIG. 2A illustrates an exemplary file of vendor data 208 that may be transferred to vendor data platform 212. The exemplary file of vendor data 208 may include vendor name 220, routing no. 222, vendor bank 224 and debit bank 226.

Figure 2B:
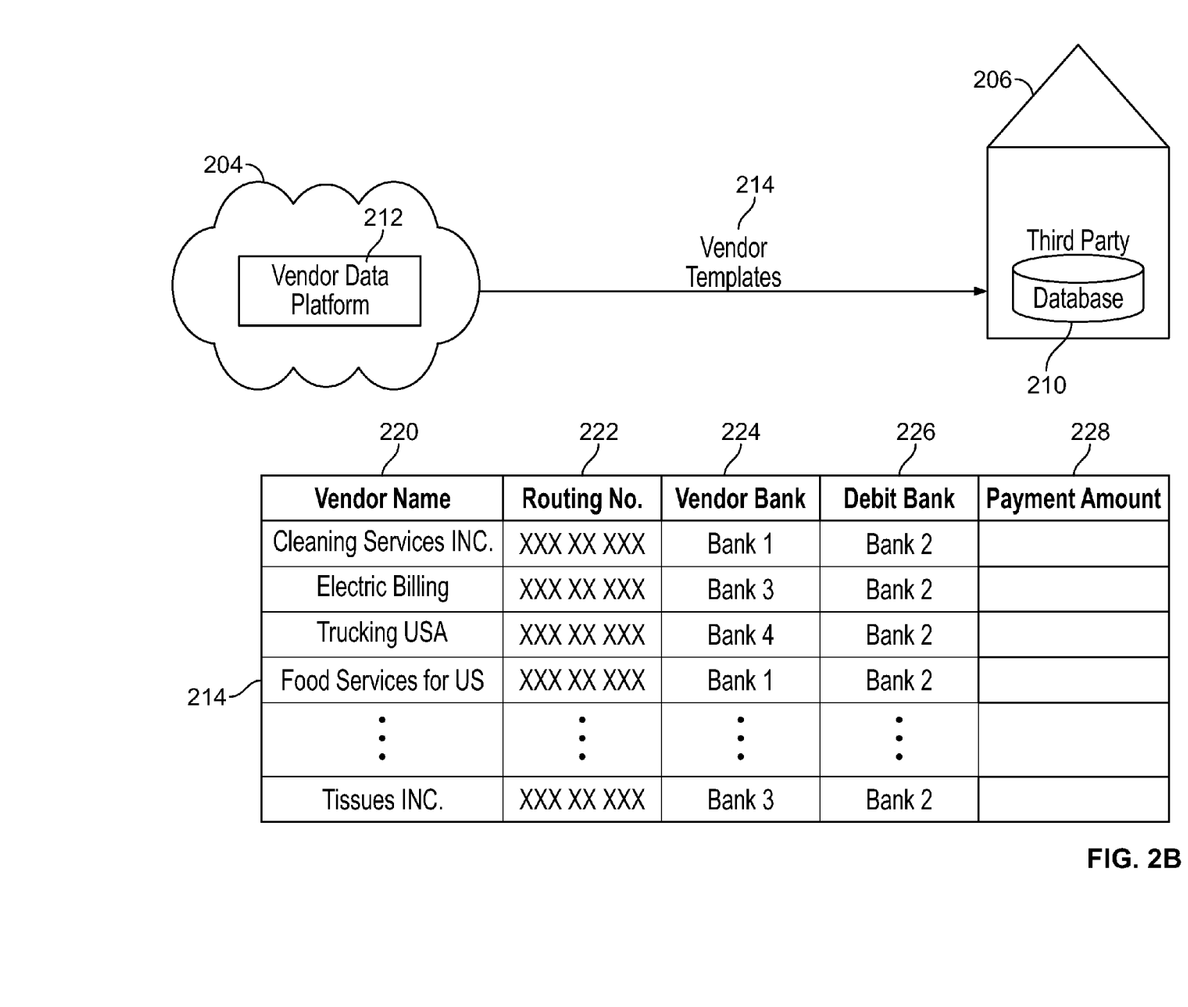
FIG. 2B shows a flow diagram of a process that may be used in accordance with the systems and methods of the invention.

FIG. 2B shows a flow diagram of another exemplary process that may be used in some embodiments of the invention. The exemplary process illustrated in FIG. 2B may include vendor data platform 212 transmitting vendor templates 214 to third party 206. Vendor data platform 212 may create vendor templates 214 based on vendor data 208 uploaded to vendor data platform 212. Third party 206 may store vendor templates 214 in database 210.

FIG. 2B illustrates an exemplary file of vendor templates 214 that may be transferred to third party 206. The exemplary file of vendor templates 214 may include vendor name 220, routing no. 222, vendor bank 224, debit bank 226 and payment amount 228. It should be noted that the column payment amount 228 may be blank. This blank column may later be used by third party 206 when augmenting partial payment files received from cloud-based engine 204.

Figure 3:
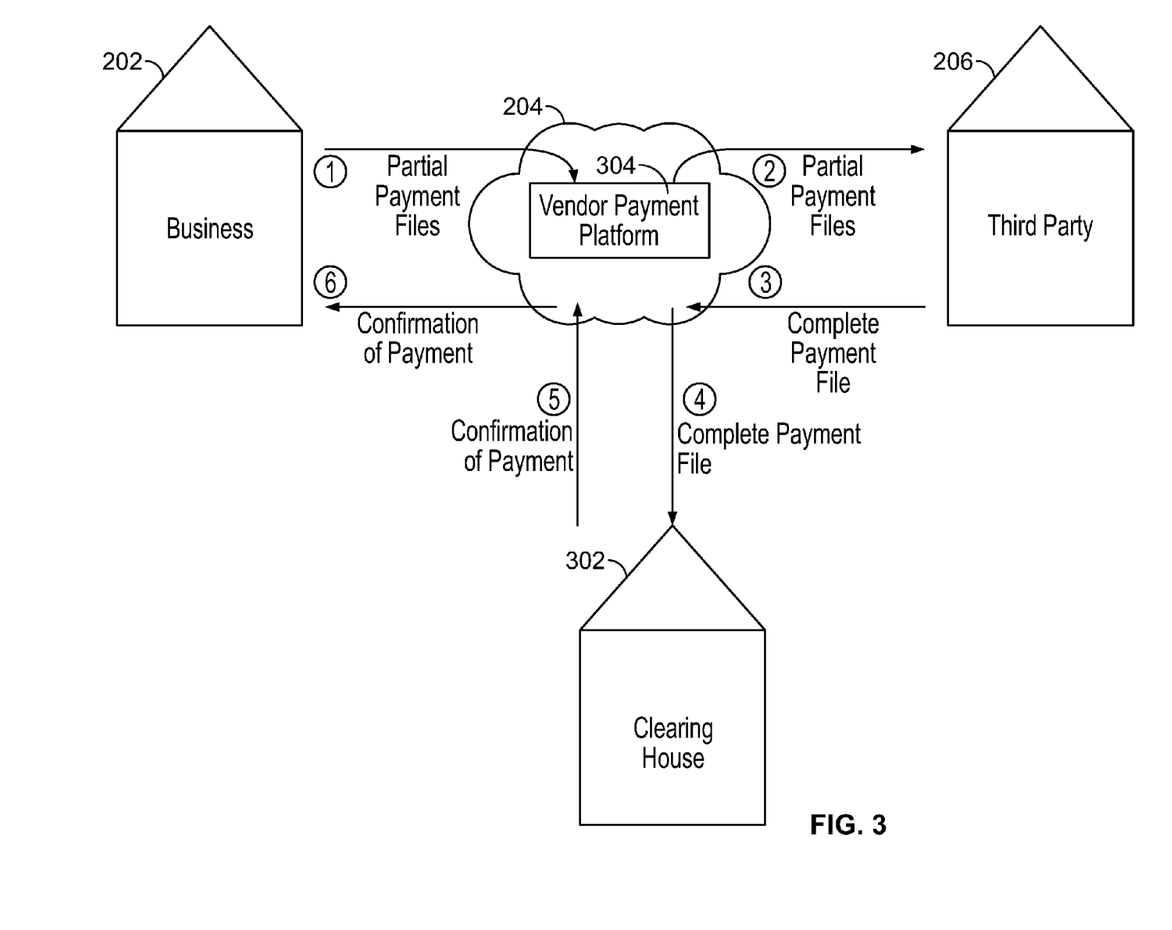
FIG. 3 shows a flow diagram of a process that may be used in accordance with the systems and methods of the invention.

FIG. 3 shows another flow diagram of an exemplary process that may be used in some embodiments of the invention. The exemplary process displayed in FIG. 3 may include steps 1-6.

At step 1, business 202 may transmit a partial payment file via the internet to vendor payment platform 304. At step 2, vendor payment platform 304 may automatically route the received partial payment file to third party 206. It should be noted that, in some embodiments, this automatic routing may preclude any possibility of altering data included in the partial payment file. Upon receipt of the partial payment file, third party 206 may execute a database merge to augment the partial payment file. This database merge may result in the creation of a complete payment file.

At step 3, third party 206 may transmit the complete payment file back to cloud-based engine 204. At step 4, cloud-based engine 204 may automatically route the complete payment file to clearing house 302. In some embodiments, this automatic routing may preclude any possibility of altering data included in the complete payment file.

At step 5, clearing house 302 may transmit a confirmation of payment to cloud-based engine 204. At step 6, cloud-based engine 204 may automatically transmit the confirmation of payment to business 202. In some embodiments, this automatic routing may preclude any possibility of altering data included in the confirmation of payment.

Figure 4:
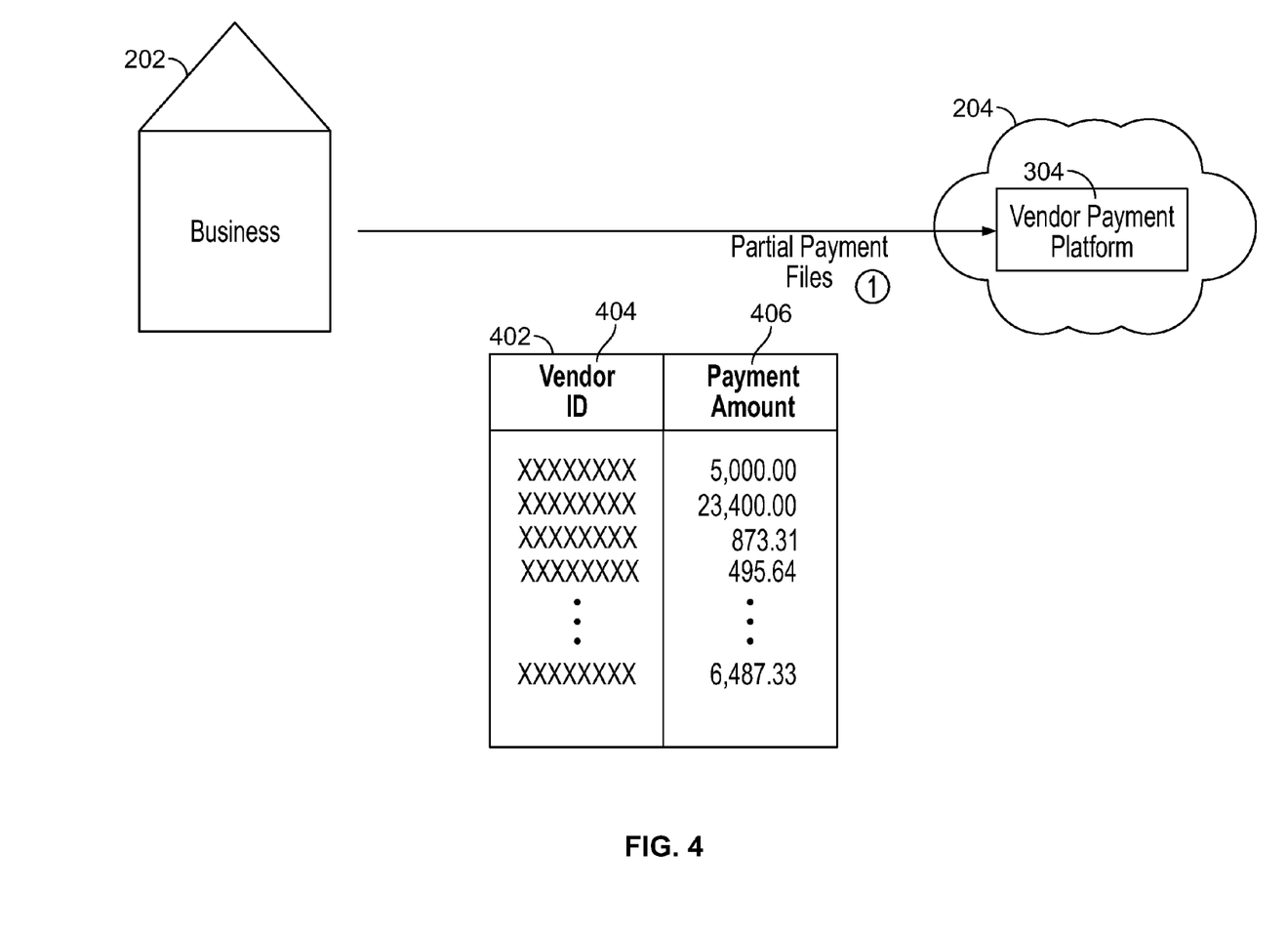
FIG. 4 shows a flow diagram of a process that may be used in accordance with the systems and methods of the invention.

FIG. 4 shows yet another flow diagram of an exemplary process that may be used in some embodiments of the invention. In FIG. 4, Business 202 may transmit partial payment Files 402 to vendor payment platform 304 via the web. Partial payment files 402 may include Vendor ID 404 and payment amount 406. Each Vendor ID 404 may be associated with a payment amount 406. For example, in FIG. 4, Vendor ID "XXXXXXXX" is associated with payment amount "5,000.00."

Figure 5:
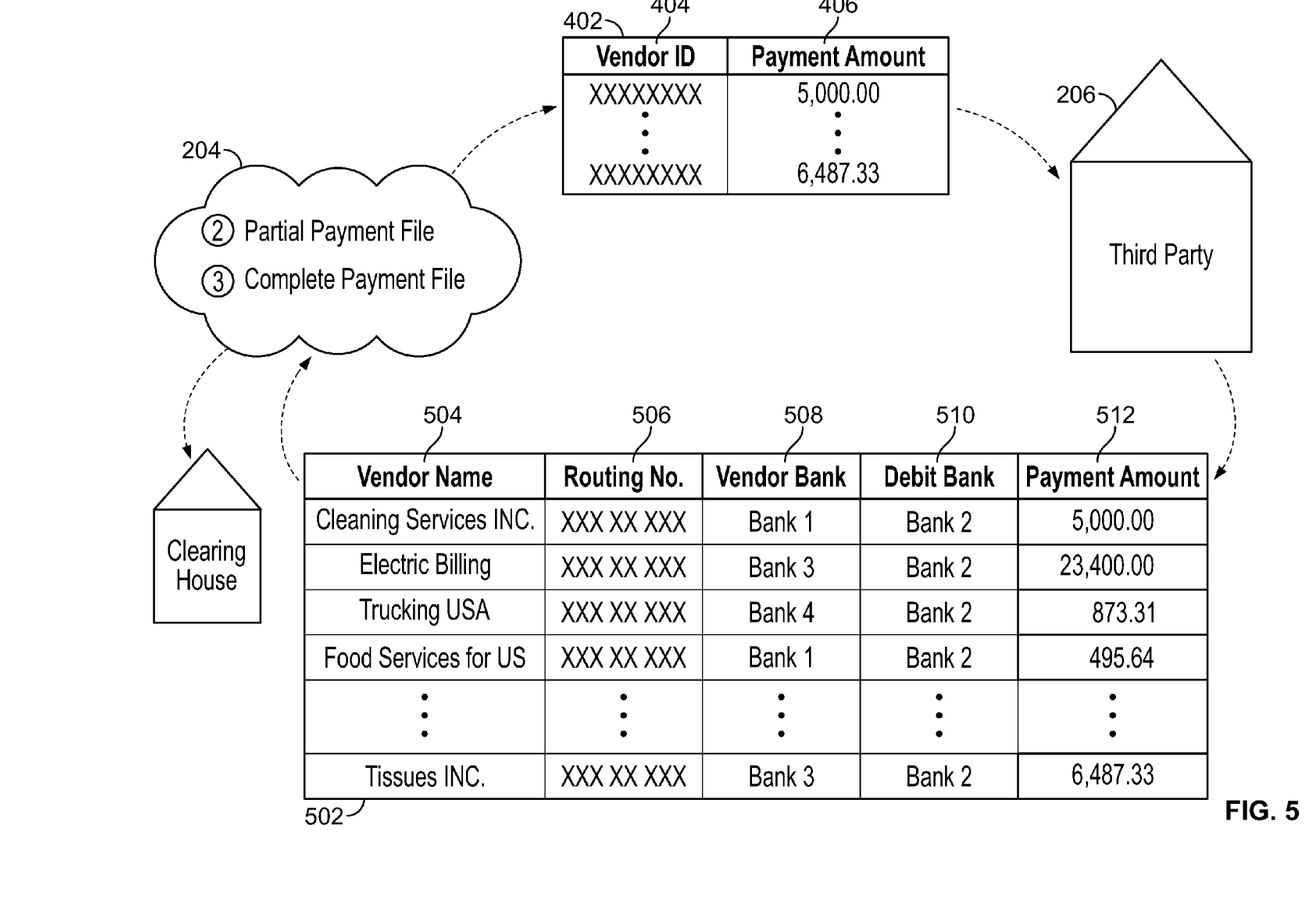
FIG. 5 shows a flow diagram of a process that may be used in accordance with the systems and methods of the invention.

FIG. 5 shows yet another flow diagram of an exemplary process that may be used in some embodiments of the invention. In FIG. 5, partial payment file 402, including Vendor ID 404 and payment amount 406, is transmitted by cloud-based engine 204 to third party 206. Third party 206 may subsequently execute a database merge and augment partial payment file 402 to include additional pieces of information, resulting in complete payment file 502. Complete payment file 502 may include Vendor Name 504, routing no. 506, vendor bank 508, debit bank 510 and payment amount 512. It should be noted that complete payment file 502 is exemplary only, and a complete payment file created by the database merge may contain more information or less information than the information included in complete payment file 502.

After creation of complete payment file 502, third party 206 may transmit the complete payment file through the web back to cloud-based engine 204. Cloud-based engine 204 may subsequently route the complete payment file to a payment clearing house.

Figure 6:
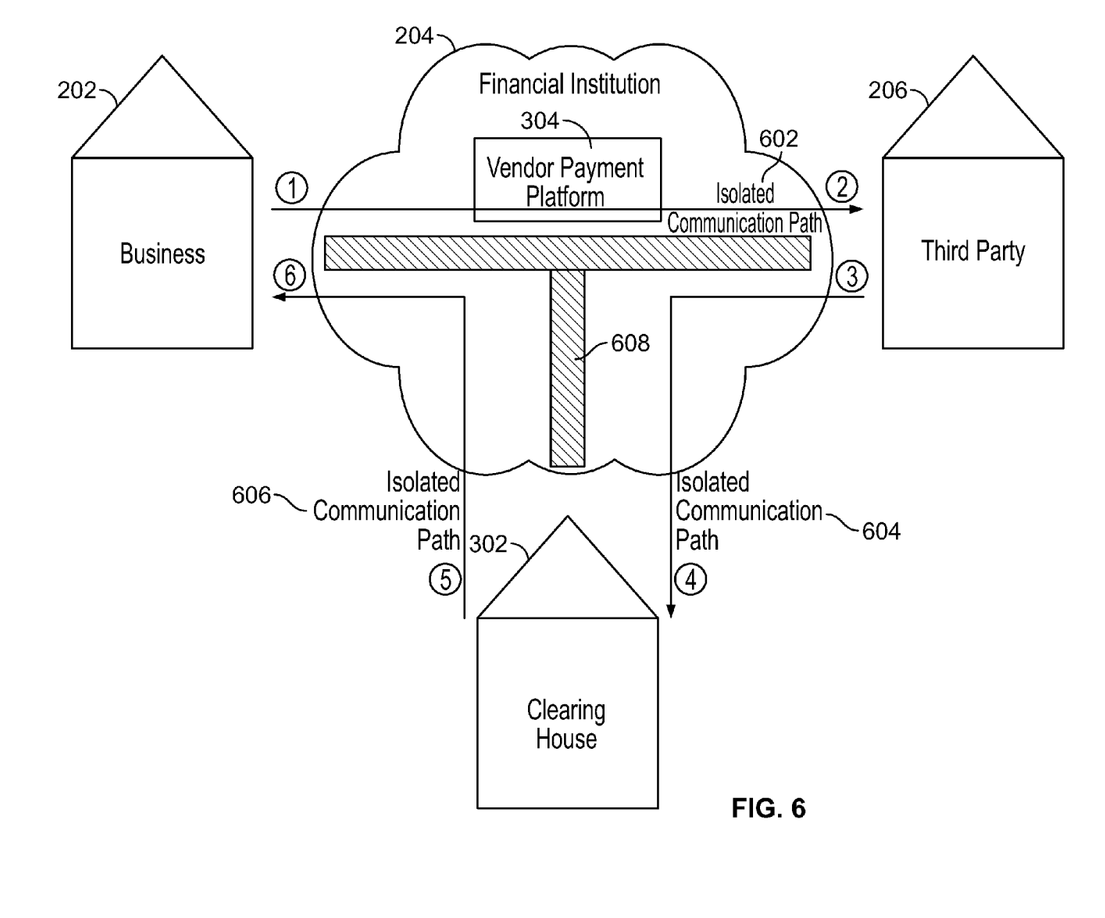
FIG. 6 shows a flow diagram of a process that may be used in accordance with the systems and methods of the invention.

FIG. 6 shows yet another flow diagram of an exemplary process that may be used in some embodiments of the invention. FIG. 6 includes steps 1-6 explained in detail above at FIG. 3. FIG. 6 additionally illustrates isolated communications paths that may be utilized by cloud-based engine 204 when communicating with business 202, third party 206 and clearing house 302. Hatched bar 608 illustrates the isolation of the data being transferred on the isolated communication paths illustrated in FIG. 6.

In FIG. 6, cloud-based engine 204 may use isolated communication path 602 for receiving partial payment files from business 202 and subsequently transferring the partial payment files to third party 206. Additionally, cloud-based engine 204 may use isolated communication path 604 to receive complete payment files from third party 206 and subsequently transfer the complete payment files to clearing house 203. Furthermore, cloud-based engine 204 may use isolated communication path 606 to receive confirmation of payment from clearing house 302 and subsequently transmit to business 202.

An exemplary functionality of one or more of isolated communication paths 602, 604 and 606 may include the inability of unauthorized personnel to access information transmitted on the isolated communication path(s). An additional exemplary functionality of one or more of isolated communication paths 604 and 606 may include the inability of both employees of business 202 and employees of the business supporting cloud-based engine 204 to alter any data being transmitted on isolated communication path 602 and/or isolated communication path 604.

Figure 7:
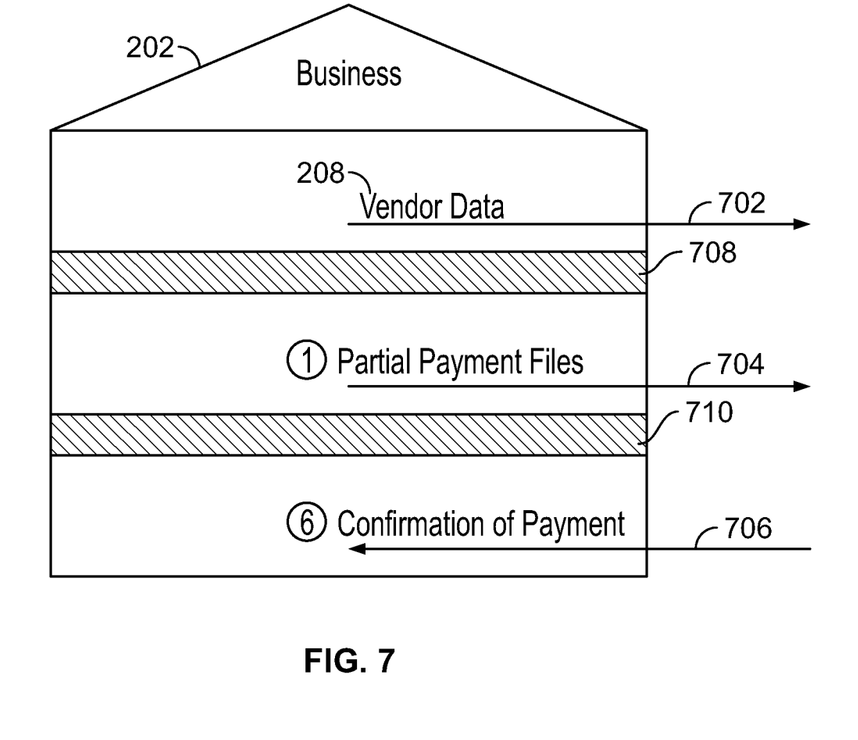
FIG. 7 shows a flow diagram of a process that may be used in accordance with the systems and methods of the invention.

FIG. 7 shows yet another flow diagram of an exemplary process that may be used in some embodiments of the invention. FIG. 7 includes the transmission and receipt of information described in detail above at FIGS. 2 and 3. FIG. 7 additionally illustrates isolated communication paths 702, 704 and 706 that may be utilized by business 202 when communicating with cloud-based engine 204. Hatched bars 708 and 710 illustrate the isolation of the data being transferred on the isolated communication paths illustrated in FIG. 7.

In FIG. 7, business 202 may use isolated communication path 702 to transmit vendor data 208 to cloud-based engine 204. Business 202 may also use isolated communication path 704 to transmit partial payment files to cloud-based engine 204. Business 202 may additionally use isolated communication path 706 to receive a confirmation of payment from cloud-based engine 204.

An exemplary functionality of one or more of isolated communication paths 706, 708 and 710 may include the restriction of access to information transmitted on the isolated communication paths to authorized business employees. In some embodiments, business employees authorized to access information transmitted or received on a first isolated communication path may not be authorized to access information transmitted or received on a second and/or a third isolated communication path.

Figure 8:
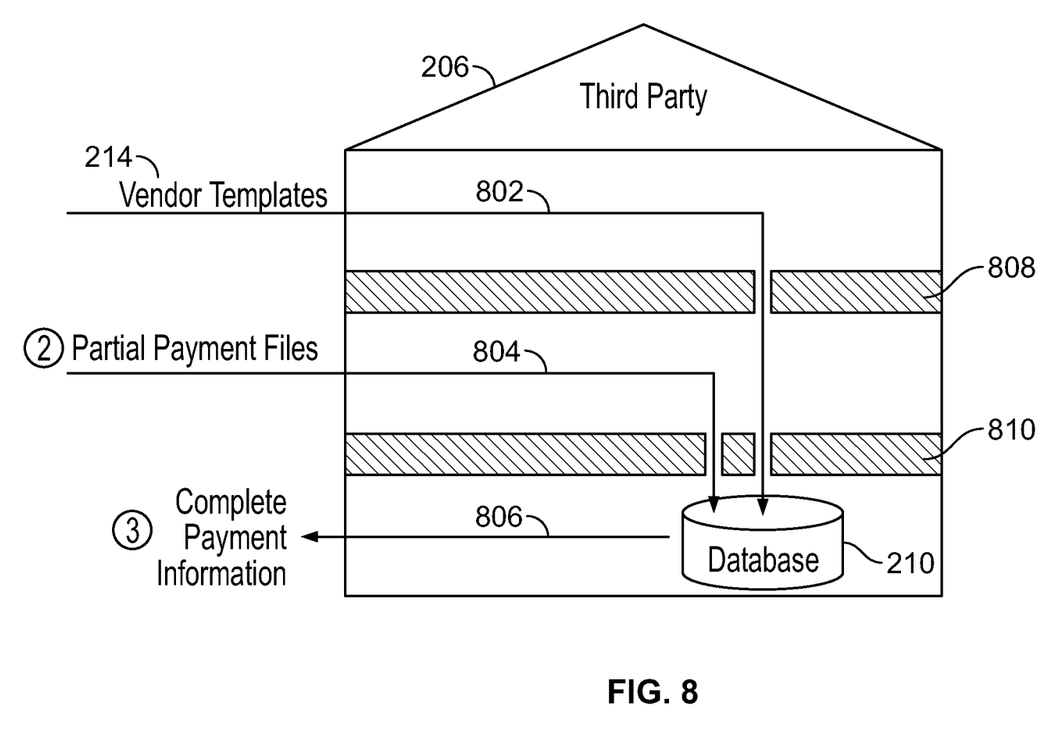
FIG. 8 shows a flow diagram of a process that may be used in accordance with the systems and methods of the invention.

FIG. 8 shows yet another flow diagram of an exemplary process that may be used in some embodiments of the invention. FIG. 8 includes the receipt and transmission of information described in detail above at FIGS. 2 and 3. FIG. 8 additionally illustrates isolated communication paths 802, 804 and 806 that may be utilized by third party 206 when communicating with cloud-based engine 204. Hatched bars 808 and 810 illustrate the isolation of the data being transferred on the isolated communication paths illustrated in FIG. 8.

Specifically, third party 206 may use isolated communication path 802 to receive vendor templates 214 from cloud-based engine 204. Third party 206 may also use isolated communication path 804 to receive partial payment files from cloud-based engine 204. Third party 206 may additionally use isolated communication path 806 to transmit complete payment information to cloud-based engine 204.

An exemplary functionality of one or more of isolated communication paths 802, 804 and 806 may include the restriction of access to information transmitted and received on the isolated communication paths to authorized third party employees, business employees and/or employees employed by the business supporting cloud-based engine 204. In some embodiments, employees authorized to access information transmitted or received on a first isolated communication path may not be authorized to access information transmitted or received on a second and/or third isolated communication path.

Figure 9:
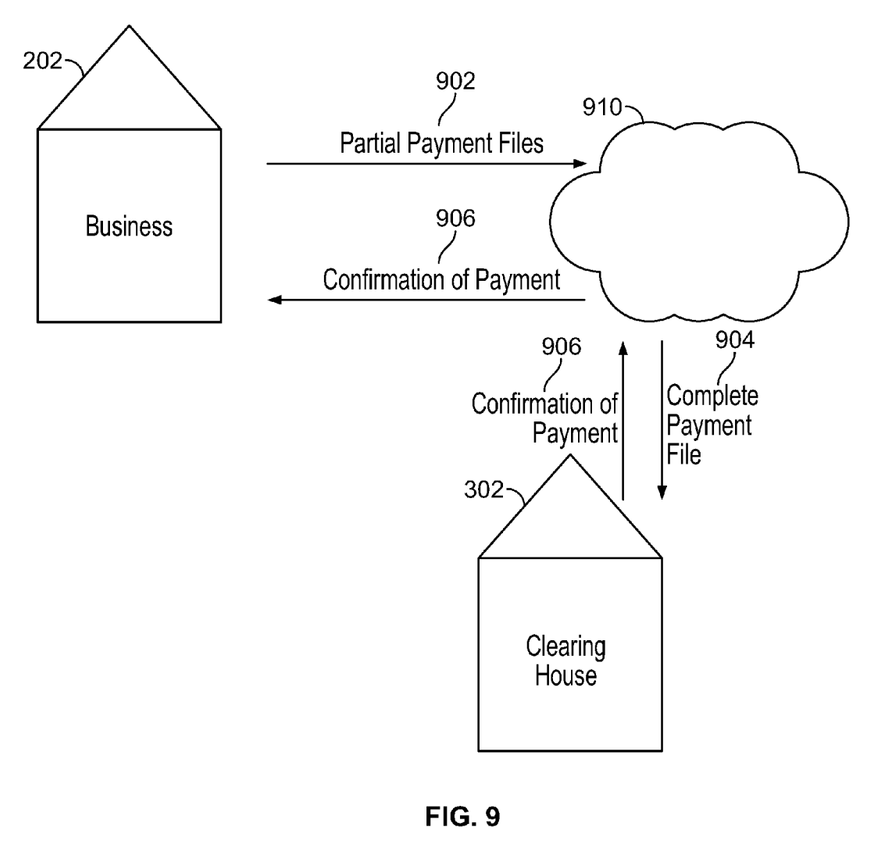
FIG. 9 shows a flow diagram of a process that may be used in accordance with the systems and methods of the invention.

FIG. 9 shows yet another flow diagram of an exemplary process that may be used in some embodiments of the invention. FIG. 9 illustrates embodiments of the invention in which vendor templates are stored in database(s) accessible to cloud-based engine 910, and cloud-based engine 910 uses one or more processors to augment partial payment files into complete payment files.

In FIG. 9, business 202 sends partial payment files 902 to cloud-based engine 910. cloud-based engine 910 subsequently augments the received partial payment files 902 to create complete payment files 904. After the files are augmented, cloud-based engine 910 transmits the complete payment files 904 to clearing house 302. Clearing house 302 subsequently executes the payments detailed in complete payment files 904 and transmits confirmation of payment 906 back to cloud-based engine 910. Cloud-based engine 910 may then route confirmation of payment 906 to business 202.

Figure 10:
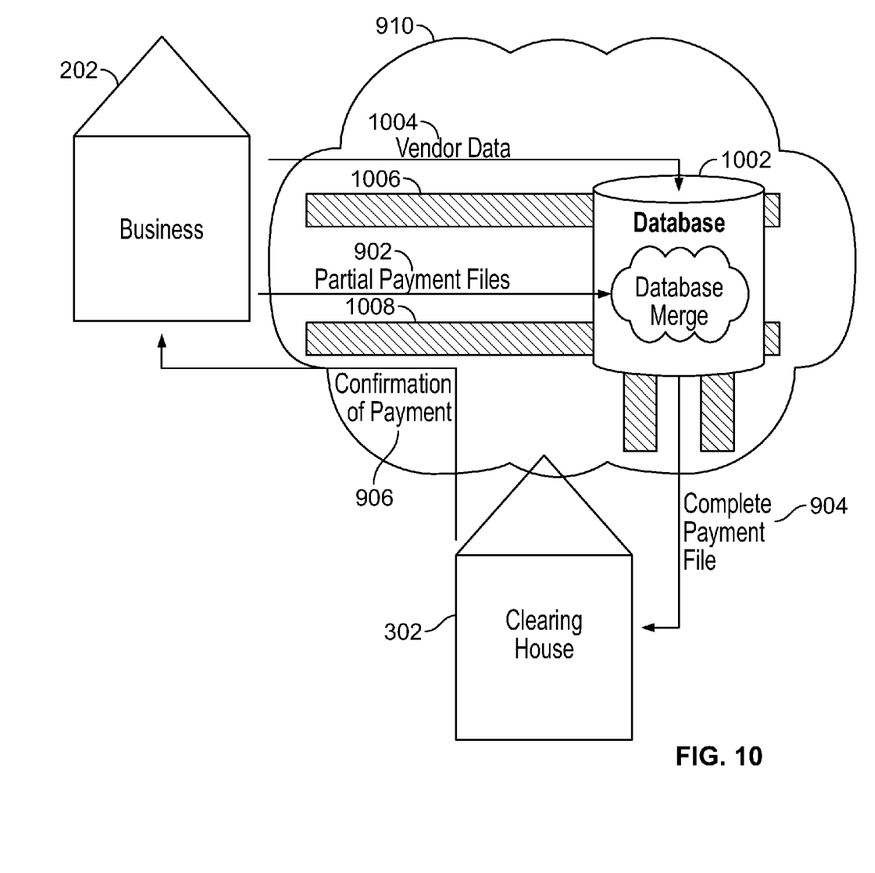
FIG. 10 shows a flow diagram of a process that may be used in accordance with the systems and methods of the invention.

FIG. 10 shows a flow diagram that illustrates additional details of the system illustrated at FIG. 9. Specifically, FIG. 10 illustrates the transmission of vendor data 1004 from business 202 to cloud-based engine 910. FIG. 10 additionally illustrates the transmission and receipt of information described in detail above at FIG. 9. FIG. 10 further includes hatched bars 1006 and 1008 that demonstrate the isolation of data being transferred in FIG. 10.

In the system illustrated in FIG. 10, the following communication lines may be isolated from one another: (1) the communications line used by business 202 to transmit vendor data 1004 to cloud-based engine 910, (2) the communications line used by business 202 to transmit partial payment files 902 to cloud-based engine 910, (3) the communications line used by cloud-based engine 910 to transmit to clearing house 302 the complete payment file 904 and (4) the communications line used by cloud-based engine 910 to receive confirmation of payment 906 from clearing house 302 and to transmit confirmation of payment 906 back to business 202. In some embodiments, the isolated communication paths may result in business employees and/or cloud-based business employees being given permissions to access only one of the illustrated communication lines.

Thus, methods and apparatus for initiating vendor payments without combining sensitive data in a single location, such that the data can be tampered with by a single operator, and/or transferring sensitive vendor data have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for initiating a payment of a vendor, the method comprising:

using a first receiver to receive a vendor name, a vendor identification number and vendor banking information;

using a first transmitter to load the vendor name, the vendor identification number and the vendor banking information into a third party database maintained by a third party, wherein the third party database includes a template manager for creating a vendor template including the vendor name, the vendor identification number and the vendor banking information;

using a second receiver to receive an incomplete payment origination request, the incomplete payment origination request including the vendor identification number and a payment amount electronically associated with the vendor identification number without the banking information associated with the identification number;

using a second transmitter to transmit the incomplete payment origination request to the third party;

using a third receiver to receive, from the third party, a complete payment origination request including the payment amount and the banking information associated with the identification number, the complete payment request being formed by augmenting the incomplete payment origination request with data stored in the vendor template; and in response to the receiving of the banking information, using a third transmitter to transmit to a clearing house the complete payment origination request for initiating a transfer of funds, said transfer of funds corresponding to the payment amount, into a vendor bank account identified in the banking information.

2. The computer-readable media of claim 1 wherein, in the method, the vendor banking information includes a vendor routing number and a vendor account number.

3. The computer-readable media of claim 1 further comprising using a fourth transmitter to transmit a confirmation message comprising the payment amount and at least a portion of the banking information.

4. The computer-readable medium of claim 1 wherein, in the method, the third party is a Software as a Service provider.

5. The computer-readable medium of claim 1 wherein, in the method, the vendor template further includes a payment field configured to be filled in by the third party.

6. Apparatus for initiating a payment of a vendor on behalf of a business, the apparatus comprising a vendor data platform, a vendor payment platform and a vendor clearing platform, wherein:

the vendor data platform comprises:
   a receiver configured to receive from the business a vendor name, a vendor identification number and vendor banking information; and
   a transmitter configured to load the vendor name, the vendor identification number and the vendor banking information into a third party database maintained by a third party;

the vendor payment platform comprises:
   a receiver configured to receive from the business the vendor identification number and a payment amount electronically associated with the vendor identification number without the banking information associated with the identification number; and
   a transmitter configured to transmit the vendor identification number and the payment amount to the third party;

the vendor clearing platform comprises:
   a receiver configured to receive, from the third party, a file including the payment amount and the banking information associated with the identification number; and
   a transmitter configured to transmit information, in response to the receiving of the banking information, to a clearing house, said information for initiating a transfer of funds corresponding to the payment amount into a vendor bank account identified in the banking information;

wherein:
   each of the vendor data platform, the vendor payment platform and the vendor clearing platform is accessible to a subset of employees, wherein the subset of employees granted access to the vendor data platform is different from the subset of employees granted access to the vendor payment platform and the subset of employees granted access to the vendor data platform is different from the subset of employees granted access to the vendor clearing platform.

7. The apparatus of claim 6 wherein:

the information received by the vendor data platform is transmitted to the vendor data platform from a first business computer address; and the information received by the vendor payment platform is transmitted to the vendor data platform by a second business computer address.

8. An article of manufacture comprising a computer usable medium having computer readable program code embodied therein for initiating payment of a vendor, the computer readable program code in said article of manufacture comprising:

computer readable program code for causing a computer to receive a vendor name, a vendor identification number and vendor banking information;

computer readable program code for causing a computer to load the vendor name, the vendor identification number and the vendor banking information into a third party database maintained by a third party, wherein the third party database includes a template manager for creating a vendor template including the vendor name, the vendor identification number and the vendor banking information;

computer readable program code for causing a computer to receive an incomplete payment origination request, the incomplete payment origination request including the vendor identification number and a payment amount electronically associated with the vendor identification number without the banking information associated with the identification number;

computer readable program code for causing a computer to transmit the incomplete payment origination request to the third party;

computer readable program code for causing a computer to receive, from the third party, a complete payment origination request including the payment amount and the banking information associated with the identification number, the complete payment request being formed by augmenting the incomplete payment origination request with data stored in the vendor template; and computer readable program code for causing a computer to transmit, in response to the receiving of the banking information, to a clearing house the complete payment origination request for initiating a transfer of funds, said transfer of funds corresponding to the payment amount, into a vendor bank account identified in the banking information.

9. The article of claim 8, wherein in the method, the vendor banking information includes a vendor routing number and a vendor account number.

10. The article of claim 8, further comprising causing a computer to transmit a confirmation message comprising the payment amount and at least a portion of the banking information.

11. The article of claim 8, wherein, in the method, the third party is a Software as a Service provider.

* * * * *